Patented Jan. 23, 1945

2,367,795

UNITED STATES PATENT OFFICE 2,367,795

COMPOSITION FOR PRESERVING CUT ORCHIDS

August A. Meyer, Maywood, Ill.

No Drawing. Application February 10, 1943,
Serial No. 475,456

2 Claims. (Cl. 71—2)

This invention relates to a composition of certain chemicals and water in which cut orchids are inserted, said composition causing favorable reactions including stimulating the development and recovery of said orchids and substantially prolonging their normal span of life.

Cut orchids are often shipped dry in cartons of soft shredded tissue paper. This method of shipment prevents bruising but does not otherwise prolong the life of the flowers. Prolongation of life has been sought by placing the stems of the orchids in sealed vials filled with water. But even in favorably cool temperatures, cut orchids after being in water for a short time are affected by oxidation. This is because the atmosphere absorbs moisture from the petals more quickly than the flowers can replace the same from the water in which the stems are inserted. This results in the decay and decomposition of the stems, and the wilting and shriveling of the petals.

Clipping of the stems from day to day, changing the water at frequent intervals, providing cooler temperatures are expedients which have been used, but they are hardly worth their trouble and inconvenience as they merely lengthen the life of cut orchids a very short time.

It is among the objects of this invention to provide a food composition for substantially prolonging the life of cut orchids, and for preserving said cut orchids at their greatest beauty for periods far beyond their normal span of life.

It is also an object of this invention to supply a composition which will rehabilitate and stiffen a sagging or bruised petal, so that it will again be self-supporting and the orchid saleable.

Other objects of my invention are to create a composition of chemicals which cooperate with each other, and are adapted to be added to and dissolved in water, into which cut orchids are inserted, said composition initiating chemical reactions in the solution to create a predigested food for the development of the blooms to maximum maturity and to provide a steady food during the prolonged life of the cut orchids; said composition in said solution also acting to harden and strengthen the fibrous structure of the stems and petals and delay decay therein and to enrich the color of the blooms, all without adding or changing water during the life of the cut orchids.

My invention also comprises such other objects, advantages and capabilities which will later more fully appear and which are inherently possessed by my invention.

While I have shown herein my preferred compositions, yet I wish it understood that the same are susceptible of modification and change without departing from the spirit of my invention.

A preferred composition selected to illustrate my invention comprises a mixture of the following in dry powder form: anhydrous sodium sulphate and hydrated aluminum sulphate having the formula $Al_2(SO_4)_3.18H_2O$. My composition may also include hydrazine sulphate and activated carbon. My composition is added to water.

The relative proportions by weight of the ingredients of my preferred composition are as follows: 12 to 18 parts of anhydrous sodium sulphate, 34 to 40 parts of hydrated aluminum sulphate having the formula $Al_2(SO_4)_3.18H_2O$, .015 part of hydrazine sulphate, .015 part of activated carbon and 42 to 54 parts of water.

I may omit either the hydrazine sulphate or the activated carbon, or both of them.

In mixing my composition, it is desirable that a departure from the high or low quantities specified, and within the respective ranges for any one of the respective ingredients should be accompanied by a substantially corresponding or proportionate reduction or increase from the high or low limits of each of the other ingredients specified in the above illustration.

My composition is preferably in the form of a liquid solution, is packed in bottles, and sold to growers and florists. When a grower uses my composition, he pours my solution into the little vials instead of water. If this is done immediately after the orchids are cut, the span of their lives will be increased from three weeks to thirty days.

When a florist uses my composition on orchids received from the grower in water filled vials, he pours out the water and replaces it with my solution. He then cuts the end of the stems and inserts the orchids into the solution filled vials. The lives of the orchids are increased at least two fold.

A florist often receives orchids with bruised petals. By cutting the stems of the orchids, supporting the bruised petals by suitable means at their proper levels, placing the orchids in a refrigerator in a temperature not over 50° and immersing the stems in my solution, the orchids will be rehabilitated. My solution will stiffen and revive the bruised petals, and rehydrate the previously sagged or shrivelled parts. The beauty of the flowers is regained and retained so that they are saleable for an extended period of time. My composition is a steady and regular food for orchids and does not over treat or harm them.

My composition may also be packed in dry powder form in packets of suitable quantity, with directions to add the amount of water as hereinbefore specified.

The orchid has become established as the most exquisite and expensive of flowers. To present an orchid is a compliment in the best of taste. However, because the orchid is expensive, the demand for the same is limited in smaller cities. Florists have requests for orchids from time to time, but cannot carry them because the cost of perishability is too high. With my composition the sixty per cent of the florists who cannot carry orchids for the above reasons may now do so. This is because with my composition the life of an orchid is so lengthened that the cost of perishability is reduced far below the profits made from having orchids available for sale.

My composition is particularly efficacious with the following varieties of orchids: *Cattleya labiata, Odontoglossum crispum* Mundyanum, *Disa grandiflora, Oncidium marshallianum, Laelia purpurata, Phalaenopsis amabilis* Dayana, *Vanda cathcarti, Miltonia phalaenopsis, Dendrobium nobile* Nobilius, *Cypriphoium lawrencanum* Hycanum, *Masdevallia harryana*, and *Aerides nobile*.

Having thus described my invention, I claim:

1. A composition of matter consisting of sodium sulfate, aluminum sulfate, hydrazine sulfate, activated carbon, and water compounded in the following proportions by weight:

| | Parts |
|---|---|
| Anhydrous sodium sulfate | 12–18 |
| $Al_2(SO_4)_3 \cdot 18H_2O$ | 34–40 |
| Hydrazine sulfate | 0.015 |
| Activated carbon | 0.015 |
| Water | 42–54 |

2. A composition of matter comprising sodium sulfate, aluminum sulfate, hydrazine sulfate, and activated carbon, compounded in the following proportions by weight:

| | Parts |
|---|---|
| Anhydrous sodium sulfate | 12–18 |
| $Al_2(SO_4)_3 \cdot 18H_2O$ | 34–40 |
| Hydrazine sulfate | 0.015 |
| Activated carbon | 0.015 |

AUGUST A. MEYER.